(12) United States Patent
Jilken

(10) Patent No.: US 10,364,993 B2
(45) Date of Patent: Jul. 30, 2019

(54) COMPOSITE STORAGE TANK MODULE AND ARRANGEMENT

(71) Applicant: Leif Jilken, Kalmar (SE)

(72) Inventor: Leif Jilken, Kalmar (SE)

( * ) Notice: Subject to any disclaimer, the term of this patent is extended or adjusted under 35 U.S.C. 154(b) by 0 days.

(21) Appl. No.: 15/353,907

(22) Filed: Nov. 17, 2016

(65) Prior Publication Data
US 2018/0073747 A1    Mar. 15, 2018

Related U.S. Application Data

(63) Continuation of application No. PCT/SE2015/050965, filed on Sep. 15, 2015.

(30) Foreign Application Priority Data

Sep. 16, 2014 (SE) ........................ 1451081
Oct. 17, 2014 (SE) ........................ 1451248
Feb. 20, 2015 (SE) ........................ 1550192

(51) Int. Cl.
*F24D 3/14* (2006.01)
*F24D 3/10* (2006.01)
(Continued)

(52) U.S. Cl.
CPC ............ *F24D 3/1041* (2013.01); *E04B 5/026* (2013.01); *E04B 5/48* (2013.01); *F24D 3/14* (2013.01);
(Continued)

(58) Field of Classification Search
CPC .............. E04B 5/026; E04B 5/48; F24D 3/14
See application file for complete search history.

(56) References Cited

U.S. PATENT DOCUMENTS 4,012,875 A * 3/1977 Hirsch ................ A62C 35/58
239/209
4,398,529 A * 8/1983 Schoenfelder ...... F24D 17/0068
126/400
(Continued)

FOREIGN PATENT DOCUMENTS

AU    2013201559 A1    4/2013
EP    0041724 A1    6/1981
(Continued)

OTHER PUBLICATIONS

Omnexus.com, Young Modulus, https://omnexus.specialchem.com/polymer-properties/properties/young-modulus, retrieved Sep. 8, 2017.*
(Continued)

*Primary Examiner* — Kenneth Rinehart
*Assistant Examiner* — Deepak Deean
(74) *Attorney, Agent, or Firm* — Gabriela B. Tomescu, Esq.; Bergenstråhle & Partners AB

(57) ABSTRACT

A composite storage tank module, tank, and arrangement wherein a composite storage tank module comprises at least one hollow section adapted to house a medium. The storage tank module is an elongated self-supporting structure produced from a composite material constituted of at least a first and second material. The composite storage tank module and arrangement are adapted to be embedded in a building structure, preferably a double flooring or a wall.

10 Claims, 16 Drawing Sheets

(51) Int. Cl.
*E04B 5/48* (2006.01)
*E04B 5/02* (2006.01)
*F28D 1/02* (2006.01)
*F28F 9/26* (2006.01)
*F28F 21/00* (2006.01)
*F28F 21/06* (2006.01)
*F28D 20/00* (2006.01)

(52) U.S. Cl.
CPC ........... *F28D 1/0246* (2013.01); *F28D 20/00* (2013.01); *F28F 9/26* (2013.01); *F28F 21/003* (2013.01); *F28F 21/066* (2013.01); *Y02B 10/20* (2013.01); *Y02B 30/24* (2013.01); *Y02E 60/142* (2013.01)

(56) References Cited

U.S. PATENT DOCUMENTS

| | | | |
|---|---|---|---|
| 5,190,215 A * | 3/1993 | Habermehl, Jr. | G05D 23/1931 165/291 |
| 5,561,958 A | 10/1996 | Clement et al. | |
| 8,122,944 B2 * | 2/2012 | Clark | F24D 3/08 165/11.2 |
| 8,677,706 B2 * | 3/2014 | Krecke | E04B 7/22 52/302.3 |
| 2002/0018907 A1 | 2/2002 | Zehner | |
| 2006/0179733 A1 * | 8/2006 | Padmanabhan | B32B 21/08 52/177 |
| 2008/0008698 A1 | 1/2008 | Bartels et al. | |
| 2009/0229598 A1 | 9/2009 | Cao et al. | |
| 2012/0219723 A1 | 8/2012 | Jilken | |
| 2013/0133858 A1 | 5/2013 | Friman | |
| 2013/0276390 A1 | 10/2013 | Krecke | |
| 2014/0014302 A1 * | 1/2014 | Gutai | F24J 2/0444 165/104.19 |
| 2014/0252691 A1 * | 9/2014 | Bollaert | B29C 49/0005 264/540 |

FOREIGN PATENT DOCUMENTS

| | | |
|---|---|---|
| EP | 2578379 A1 | 4/2013 |
| JP | 2013197252 A | 9/2013 |
| JP | 2014163647 A | 9/2014 |
| SE | 0701395 L | 1/2009 |
| SE | 0800177 L | 7/2009 |
| SE | 532498 C2 | 2/2010 |

OTHER PUBLICATIONS

The Engineering Toolbox, Modulus of Elasticity for common Materials, http://www.engineeringtoolbox.com/young-modulus-d_417.html, retrieved Sep. 8, 2017.*

Mahir H.H. Es-Saheb, The Temperature Effects on High Density Polyethylene (HDPD) Pipes, http://www.kau.edu.sa/Files/320/Researches/52515_22822.pdf, retrieved Sep. 8, 2017.*

P. Jouannot-Chesney et al., Young's Modulus of Plant Fibers, 2016, RILEM, Natural Fibres: Advances in Science and Technology Towards Industrial Applications, RILEM Bookseries 12, pp. 61-69.*

* cited by examiner

COMPOSITE STORAGE TANK MODULE AND ARRANGEMENT

This application is the continuation of International Application No. PCT/SE2015/050965, filed 15 Sep. 2015, which claims the benefit of Swedish Patent Application Nos. SE 1451081-2, filed 16 Sep. 2014, SE 1451248-7, filed 17 Oct. 2014 and SE 1550192-7, filed 20 Feb. 2015, the entire contents of which are hereby incorporated by reference.

TECHNICAL FIELD

The present invention relates generally to a composite storage tank module.

BACKGROUND ART

Heating systems in domestic and commercial environments as well as other similar systems storing or handling liquids generally requires some sort of expansion tank, flash tank, thermal storage tank, or other storage tank in order to function properly. A typical example is thermal heating systems for building structures, such as houses or other buildings, wherein radiators or underfloor heating is connected to a water system heated by any form of heating source such as solar panels, direct electricity heating, an oil boiler, or similar.

Storage tanks in prior art are commonly produced from metal or plastic materials, such as different polymers. The person skilled in the art normally selects the location of such a tank during the planning phase before constructing a building structure. There are multiple options, such as if the tank should be located indoors or outdoors as well as where to place it. Depending on the climate in the location where the building structure is built are different methods utilized, for example in northern or other colder climates is it most common to place the tank indoors. This means that for cold climates the storage tank is normally located indoors and thereby occupies space from the living or storage areas. It should furthermore be noted that indoor tanks also are common in warmer climates. One reason for this is that it is easier to install a tank within the building structure than to place it underground somewhere in the vicinity of the building structure. Storage tanks, such as the ones described above, generally comprises multiple disadvantage based on their design and function. For example, a common problem is that storage tanks leak heat into the ambient environment, normally an attic or basement of a building. The leakage of heat reduces the efficiency of the heating system through the additional energy loss. Another problem is that storage tanks of the prior art occupies a significant amount of space within the building structure that otherwise could be utilized for other purposes.

Yet another disadvantage is that the tank is difficult to install, service, and especially remove. In many cases are the tanks placed inside the building structure before said building structure is completed due to their size. This means that if the tank shall be replaced at a later point in time, it probably have to be cut into pieces within the building structure before removed. This further has the effect that it is difficult to get a similar tank into the same position again.

As previously stated, it is in prior art known to place storage tanks outside of a building structure as an alternative solution. This solution minimizes the space that is occupied inside the building structure by the storage tank. However, while decreasing the required space inside the building structure this solution increases the loss of heat into the ambient environment and increases the external influences of the storage tank, thereby reducing the life expectancy of such a unit.

It would thereby be beneficial to provide a solution which solves the problems of the prior art.

SUMMARY OF INVENTION

An object of the present invention is to minimize the space required for an accumulator tank, storage tank, flash tank, or similar in a building structure without the previously mentioned drawbacks of placing the tank outside. Another object is to reduce the energy loss created from heat leaking into the ambient environment through utilizing the leaking energy. Yet another object of the composite storage tank module is to create an inexpensive modular solution that is easy to install, service, maintain, and replace without the drawbacks of the prior art.

Thus the invention relates to a composite storage tank module wherein said composite storage tank module comprises at least one hollow section adapted to house a medium. The storage tank module is an elongated self-supporting structure produced from a composite material constituted of at least a first and second material, and the composite storage tank module is adapted to be embedded in a building structure, preferably a double flooring, roof, or a wall.

The composite storage tank module is a self-supporting composite structure that is substantially hollow through one or more hollow sections. The hollow sections vary in size and number in different embodiments within the herein claimed scope. The hollow sections are adapted to house a medium wherein the medium is any form of liquid medium but it is preferred that the medium is water or any form of mixture that is constituted of mainly water.

An advantage with the composite storage tank module is that the self-supporting structure makes it easy to install, service, and maintain. The tank module is easy to arrange on any form of structural support and the elongated structure makes it well adapted to be arranged in a space saving manner. Another advantage is that the elongated structure is adapted to be embedded in a building structure, such as in double flooring or a wall, creating the solution that the composite storage tank module works as a replacement for insulation between indoor areas. Furthermore, it is one advantage that a substantial amount of the heat that leaks from such a structure leaks into the inside of the building structure.

The self-supporting structure is capable of supporting the entire tank module, filled or empty, and can in addition to supporting its own weight be used as part of the building structure. The composite material makes the product as strong as many other building materials, such as wood utilized for wooden building structures.

This means that in one embodiment are the composite storage tank modules arranged in a way that they help support the load of for example a floor. In another embodiment are the modules arranged in a way to support their own weight. The composite storage tank modules are thereby possible to arrange without total support underneath, for example on transversal floor beams. This is an advantage of the self-supporting structure of the composite storage tank modules that is not achieved by the prior art solutions.

It is one further advantage with the composite storage tank module that the solution is modular and thereby can be combined in any way possible in order to create a composite storage tank, composite storage tank arrangement, or composite storage tank system customized for every installation or implementation. The modular solution enables the composite storage tank modules to be placed for example between floor beams in the center-to-center distance (c.t.c/ C-C distance).

According to one embodiment of the composite storage tank module is the composite storage tank module produce through extrusion.

The production method of a composite storage tank module is closely related to the end customer price of the module. It is thus advantageous to use a production method that decreases the production cost of such a module. Extrusion is an effective production method wherein elongated shapes are extruded at a quick pace. To produce the tank at low cost while ensuring that rigid structure is created extrusion has proven to be an advantageous production method. Prior art tanks are generally of a different shape and form why they often are produced through die casting or vacuum forming. The shape and form of the extruded composite storage tank module is beneficial in order for it to be produced through extrusion as well as for the implementation in building structures.

According to one embodiment of the composite storage tank module, the first and second materials have equal or substantially equal coefficients of elasticity.

Composite materials are subject to degradation over time, especially when containing polymers. It is one advantage of the present solution that the composite material is constituted of materials with equal or substantially equal coefficients of elasticity. This improves the performance of the material and eliminates many problems relating to cracks, degradation, and fatigue of the material.

Another advantage in relation to prior art solutions is that the composite storage tank module is produced of a composite material with substantially equal coefficients of elasticity which is self-supporting. This means that the structure constituting the storage tank module is a robust structure capable of withstanding load, carrying its own weight, and even be used as building material for building wharfs, piers, houses, roofs, etc.

According to one embodiment of the composite storage tank module are, out of said first and second materials at least one a polymer and one an organic fiber material, preferably wherein the latter is selected from a cellulous based material and a wooden material.

By selecting a wooden material and a polymer material as the components for the composite material a fully recyclable product is created. This enables that the product may be recycled and used for creating new composite storage tank modules or other products utilizing the same material. In addition, the recyclable material adds to the environmentally friendly profile of the product.

According to one embodiment of the composite storage tank module, one out of said first and second materials has a shape selected from a whirl and bogie spring shape.

In addition to using the same coefficient of elasticity the composite material can be made stronger through utilization of parings, curling chips, shavings, or similar that has a whirl or bogie spring shape creating extra flexibility in the fibers. This further reduces the risk of crack building in the composite storage tank modules.

According to one embodiment of the composite storage tank module is the composite storage tank module adapted to be used as shell framework building material for a building structure. Examples of shell framework building materials are insulation and building parts for intermediate partitions, such as partition panels or partition wall sections.

This is mainly enabled by the self-supporting structure of the composite storage tank module.

According to an embodiment of the composite storage tank module is the composite storage tank module adapted to store a warm medium and adapted to be arranged to enable that the excessive heat emitted from said composite storage tank is used as underfloor heating.

It is one advantage of the composite storage tank modules that they are adapted to be arranged in a double flooring of a building structure, preferably between two floors, between a living floor and a basement, or in the double floor of the first floor. This has the effect that the excessive heat that is leaked from the composite storage tank modules creates an underfloor heating system providing additional value for the inhabitants of said building structure.

According to an embodiment the composite storage tank module constitute the composite storage tank.

Depending on the characteristics of the building structure, the required volume of the tank, and other factors such as the desired area of underfloor heating the size of the composite storage tank as well as the size of each composite storage tank module may vary. According to one embodiment are the composite storage tank constituted of solely a single composite storage tank module, in another embodiment are multiple composite storage tank modules used to create the composite storage tank.

According to an embodiment of the composite storage tank module is the storage tank used as a radiator.

The composite storage tank modules are useful as modular systems and can be implemented in both walls and double flooring, however it should be understood that the modular tanks can be placed or integrated into other structures as well. In one embodiment is the storage tank module furthermore arranged on for example a wall as a radiator unit. The person skilled in the art understands that a composite storage tank or composite storage tank arrangement may be constituted of any number of composite storage tank modules arranged in any possible way. As means of example are in one embodiment four composite storage tank modules arranged in the double flooring of a building structure and one composite storage tank module arranged as a radiator visible in the room. However, in one embodiment are the composite storage tank modules solely arranged in the floor, on the wall, or in the wall.

According to one aspect of a composite storage tank arrangement comprising at least two composite storage tank modules are said composite storage tank modules arranged side by side in a double flooring of a building structure, preferably between floor beams, and wherein said composite storage tank modules are interconnected to mutually constitute at least one composite storage tank.

The storage tank arrangement is constituted of multiple composite storage tank modules that are connected in order to create one or more composite storage tanks. The one or more composite storage tanks might be connected to different or the same fluid systems. In one embodiment are two different storage tanks in a storage tank arrangement connected to each other but divided by a valve as will be further described in embodiments below.

According to an embodiment of the composite storage tank arrangement is the composite storage tank arrangement connected to at least one heating system, preferably solar collectors.

The composite storage tank arrangement and each composite storage tank thereof (one or more) are in a preferred embodiment connected to at least one heating system each. Heating systems are for example solar collectors, an oil boiler, geothermal heating, direct electric heating, or any other form of heating system. However, it is understood that multiple tanks could be utilized without multiple heating systems as well, for example if hot water and cold floors are desired as will be made clear through the advantages of dual layer composite storage tanks as presented below.

According to an embodiment of the composite storage tank arrangement the composite storage tank arrangement comprise composite storage tank modules placed in dual layers, as a first and second layer, and wherein said composite storage tank modules are arranged in a double flooring of a building structure.

According to one embodiment of the composite storage tank arrangement are the composite storage tank arrangement divided into two different tanks wherein the first tank is arranged in a first layer and the second tank is arranged in a second layer, both layers within the double flooring in a building structure. There are multiple advantages of the dual layer arrangement of composite storage tank arrangements, for example that the volume of the tank can be increased significantly. Through arranging the tanks in different layers are also other effects achieved. For example, by having warmer medium in the second layer than in the first layer the cooler medium in the second layer is heated by said first layer. Depending on season variations and especially the variation in outdoor and indoor temperature it is sometimes advantageous to have a warm medium in the second layer closest to the walking surface of the floor. In other situations it is advantageous to have colder medium in the layer closest to the walking surface in order to cool the floor and make it more comfortable to walk upon.

It is thereby one advantage of the present solution that the floor may be either heated or cooled through adjusting the temperature of the medium in the upper layer of composite storage tank modules.

It is another advantage of the present solution that the lower layer may contain medium of any temperature fulfilling another purpose or a similar purpose than the upper layer.

It is yet another advantage of the present solution that medium of different temperatures, such as ±20° C., can be stored in the different layers of the composite storage tank without the temperature equalizing between the layers immediately. This is due to the composition of the composite material.

According to one embodiment of the composite storage tank arrangement is the first layer of composite storage tank modules and said second layer fluidly separated, preferably to allow said first and second layers to house medium of different temperatures.

In one embodiment are said first and second layers slightly spaced apart by means of a spreader.

Dual layers adapted for different temperatures are furthermore utilized to implement dual heating systems in a building structure. For example, in one embodiment is a building structure heated both by solar collectors and another heating source that isn't relying on sunlight.

According to one embodiment of the composite storage tank arrangement are,
    at least two composite storage tank modules arranged in fluid connection,
    said fluid connection comprising at least one valve,
    in a closed state are the composite storage tank modules creating a first and a second sub-tank,
    in an open state are the composite storage tank modules creating one tank,
    the composite storage tank arrangement is connected to at least two heating systems, and
    the heating systems can be used separately and together through means of actuation of the valve.

Another advantage of the solution as presented herein is that independent of if the solution is implemented with dual layers or not it is possible to have multiple tanks due to the modular structure of the composite storage tank arrangement. The tanks may in a preferred embodiment be divided in a way making the first layer and the second layer to form one tank each. However, in another embodiment are the tanks constituted of any one or more of the composite storage tank modules. This has the advantage that the effect of multiple heating systems is utilized in a better way than in traditional systems wherein only one tank is used. The valve between the sub-tanks is used both for dividing the tanks in order to enable divided systems, for example as beneficial in the embodiment described above wherein the different sub-tanks constitute different layers. The different layers are usable for example as underfloor heating or cooling. In another state, or another embodiment, are the valves used to connect the two heating systems to one another in order to create a solution wherein the heat difference from the different heating systems are equalized creating a system in balance. The person skilled in the art understands that the solution may comprise any number of valves and that it is not limited to a single valve.

According to an embodiment of the composite storage tank arrangement does the first and second sub-tanks corresponds to the first and second layers.

According to an embodiment of the composite storage tank arrangement is the composite storage tank arrangement arranged as an underfloor heating system.

According to an embodiment of the composite storage tank arrangement does the composite storage tank arrangement further comprise at least one sprinkler nozzle.

The composite storage tank arrangement comprises a large amount of medium, preferably water, which is stored within the building structure. The medium is in case of fire useful in order to fight the fire and especially for fighting a fire through a sprinkler system. Thereby it is advantageous to arrange at least one sprinkler nozzle in the composite storage tank arrangement or connect the composite storage tank arrangement to a sprinkler system.

According to an embodiment of the composite storage tank arrangement is said sprinkler nozzle adapted to fight and prevent a fire in solar cells.

Solar cells are commonly installed on roofs of building structures and are considered a good option for generating environmentally friendly energy. However, there are multiple problems relating to fire and solar cells. A solar cell constantly produces energy regardless if the energy is consumed or not. Regular power connections connecting building structures to the grid comprise safety switches allowing a fire fighter arriving to a fire to turn the power off. However, the location of solar cells in combination with the installation generates a situation wherein the power can't be turned off. It is therefore dangerous to fight fires that originates in a solar cell or that has caught a solar cell within its flames. Water from the hose may become a conductor as well as other tools utilized by the fire fighters producing a risk of electric shock.

It is thereby advantageous to use a medium that is already at the location and that can be utilized without human interaction. The sprinkler nozzle or sprinkler system can thereby prevent fires from spreading to solar cells and fight the fire within the entire building structure depending on the amount of medium available in the composite storage tank arrangement.

It is understood that any of the aforementioned embodiments could be combined in any suitable way within the scope of the invention as long as such combination is not contradictory to the overall functionality of the composite storage tank module or arrangement thereof.

BRIEF DESCRIPTION OF DRAWINGS

The invention is now described, by way of example, with reference to the accompanying drawings, in which.

DESCRIPTION OF EMBODIMENTS

In the following is a detailed description of the composite storage tank module provided in light of the appended drawings.

Figure 1:
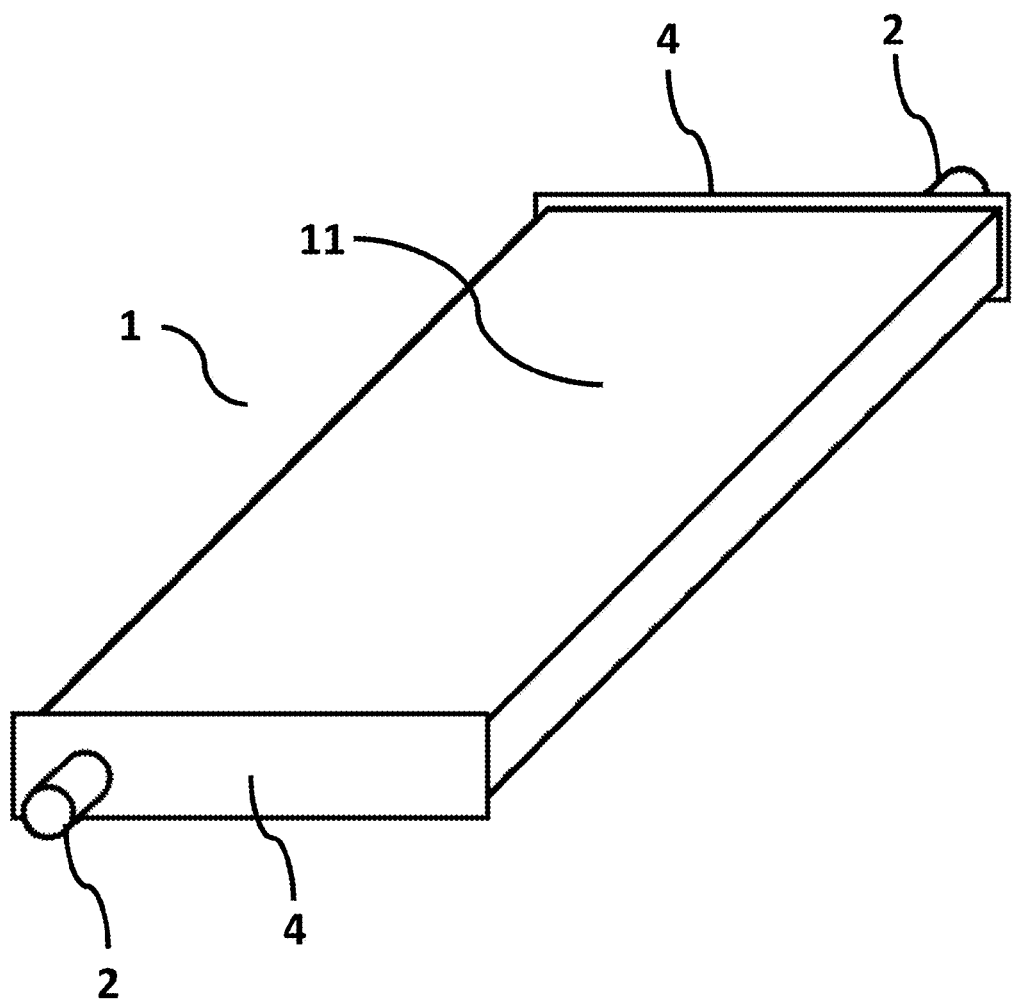
FIG. 1 illustrates one embodiment of a composite storage tank module.

FIG. 1 illustrates the composite storage tank module 1 in a preferred embodiment wherein the composite storage tank module 1 comprises a first surface 11, an inlet and outlet 2, as well as two end pieces 4. The person skilled in the art understands that the composite storage tank module 1 further comprises a second end piece 4, as well as a second surface hided or partly hidden from view in FIG. 1. FIG. 1 further illustrates the elongated shape of the composite storage tank 1 which is a preferred embodiment. However, those skilled in the art understand that the composite storage tank module 1 can have different shapes or forms within the scope of the claimed invention.

Figure 2:
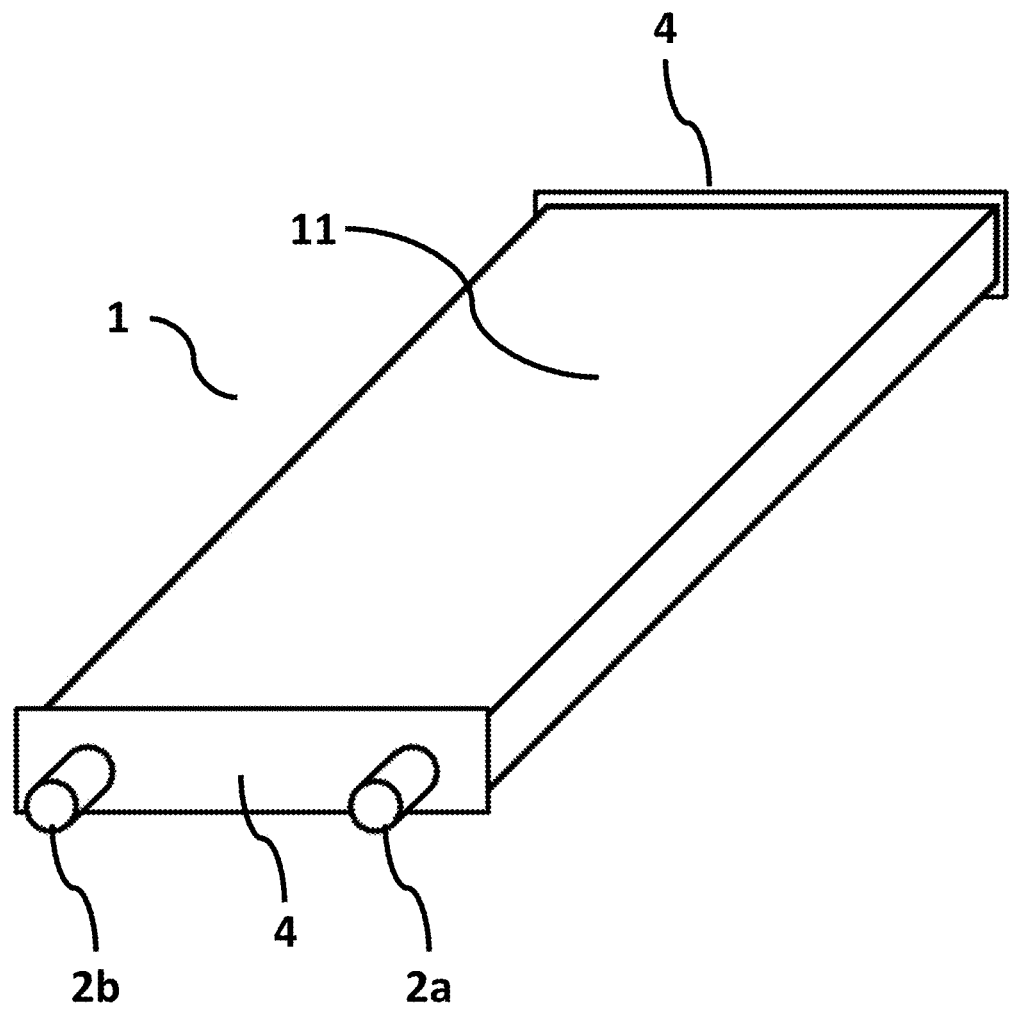
FIG. 2 illustrates another embodiment of a composite storage tank module.

FIG. 2 illustrates another embodiment of the composite storage tank module 1 wherein the inlet and outlet 2 are arranged on the same end piece 4 enabling for connection from one side only. This is advantageous in situations wherein the composite storage tank module 1 easily is accessed from one side.

Figure 3:
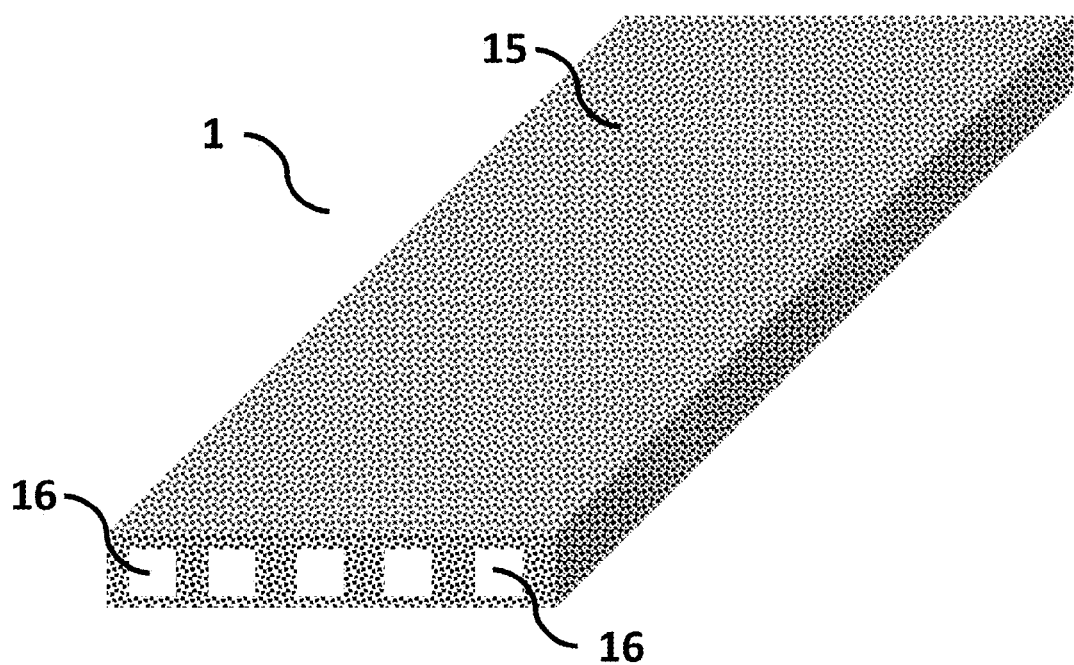
FIG. 3 illustrates the composite material and the hollow sections of one embodiment of a composite storage tank module.

FIG. 3 illustrates a principal sketch of the composite storage tank module 1 wherein the composite material 15 is illustrated. As shown the composite material is a mixture of at least two components that constitutes the production material for the composite storage tank module 1. In a preferred embodiment are these materials at least one polymer with equal coefficient of elasticity with wooden scobs. However, the person skilled in the art understands that any materials with equal or substantially equal coefficient of elasticity could be used by the person skilled in the art for producing the composite storage tank module 1 as herein disclosed. FIG. 3 further illustrates the hollow sections 16, or channels 16, that the medium is stored, circulated, or transported within.

FIG. 3 further illustrates an example of how the storage tank module body in one embodiment could look during production, for example the collector body could be extruded in long continuous sections.

Figure 4:
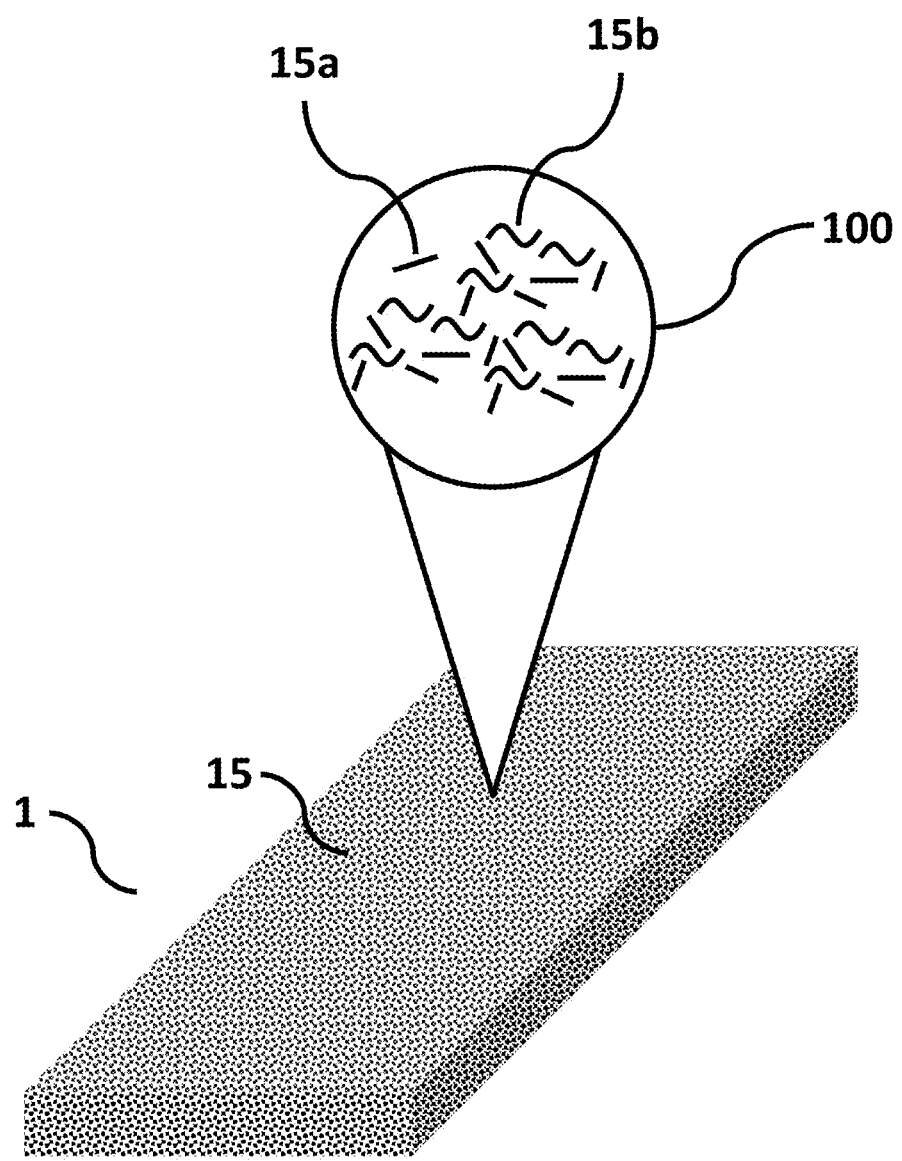
FIG. 4 illustrates one embodiment of the composite material consisting of at least two materials, wherein one of the materials has a material structure shape of a whirl or bogie spring.
Figure 10:
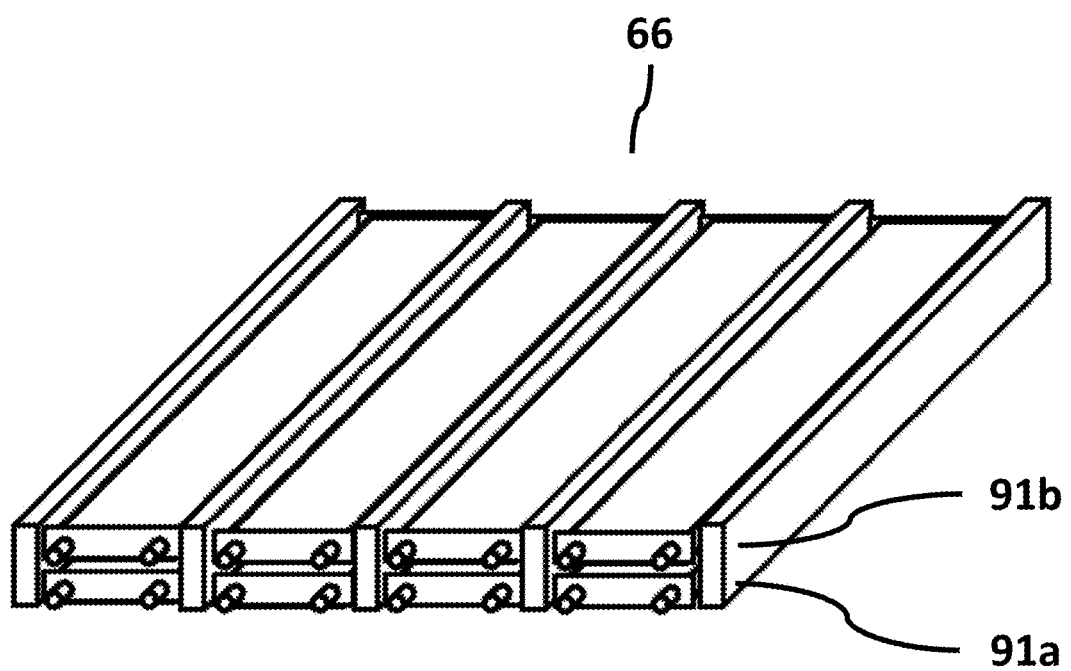
FIG. 10 illustrates one embodiment of multiple composite storage tank modules, in a composite storage tank arrangement, arranged between floor beams in a double flooring in dual layers.

FIG. 4 illustrates one embodiment of the composite material 15 of the storage tank module 1 wherein an illustrative magnification 100 illustrates the composite material 15 in further detail. The embodiment as illustrated in FIG. 10 is a preferred embodiment of the composite material 15 wherein two different materials 15a, 15b, are used. The first material 15a being a polymer and the second material 15b being wood fiber parings, wood fiber curling chips, wood fiber shavings, or similar wood fibers that has a whirl or bogie spring shape. The wood fiber that has a whirl or bogie spring shape creates elasticity in the material which is a significant improvement over solutions where straight wood fibers are used. The usage of whirl or bogie spring shaped fibers are not a limiting embodiment for the storage tank module however a significant improvement and a preferred embodiment. For embodiments where straight fibers, such as sawdust or scobs, are used for composite materials the composite material becomes robust but fragile and with a low amount of elasticity. This creates problems when loads are applied to the storage tank module and the risk of cracks in the material increases.

According to one embodiment of the composite storage tank module is any form of wooden material usable as the second material 15b without limitations to a certain wood type. The key is that wooden fibers differ from other fibers, such as carbon fiber or glass fiber by means of their fundamental design. Natural fibers are adapted to transport water in for example a tree and have thereby developed a structure that consists of fibers that are curved, twisted, or whirl formed. However, other fibers, such as glass fiber and carbon fiber, are straight and thereby less flexible. The first material 15*a* could be any form of polymer, preferably polyethylene or polypropylene depending on the geographical place wherein the solar collector is applied. Polyethylene handles degrees below zero better than polypropylene and is thereby better suited for some geographical regions. In another embodiment can hemp from old bags or similar be used as the second material 15. This creates additional dimensions to the sustainability of the solar collectors. The solar collectors are in addition to being fully recyclable possible to produce from material recycled from other products.

Figure 5:
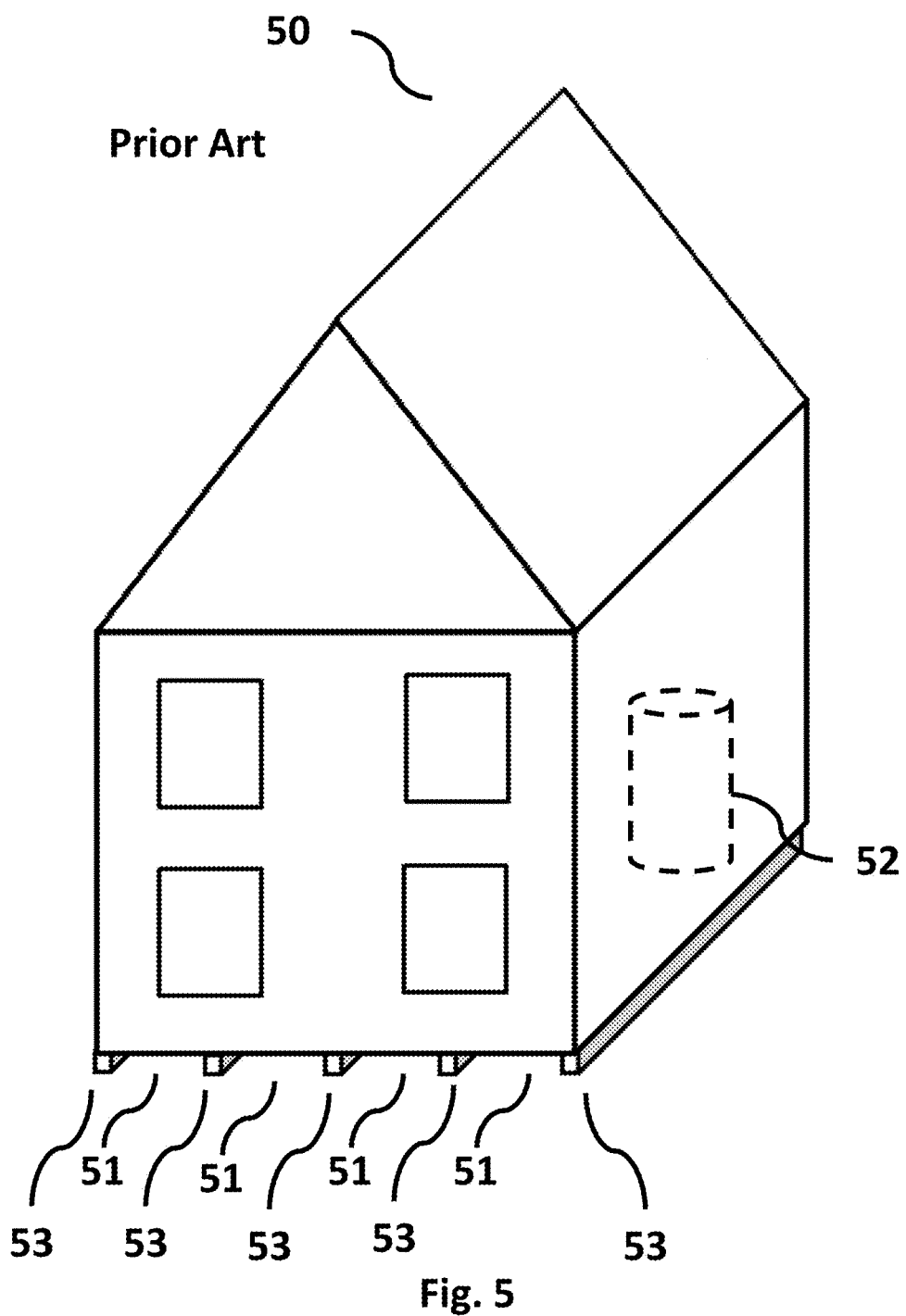
FIG. 5 illustrates a typical prior art system with a storage tank arrangement arranged in the living area of a building structure.

FIG. 5 illustrates a prior art solution wherein a storage tank 52 is arranged in the living area, or the disposable area, of a building structure 50. The storage tank 52 is normally connected to for example the heating system of said building structure 50. The building structure 50 is insulated, for example in the double flooring 51 between the floor beams 53.

Figure 6:
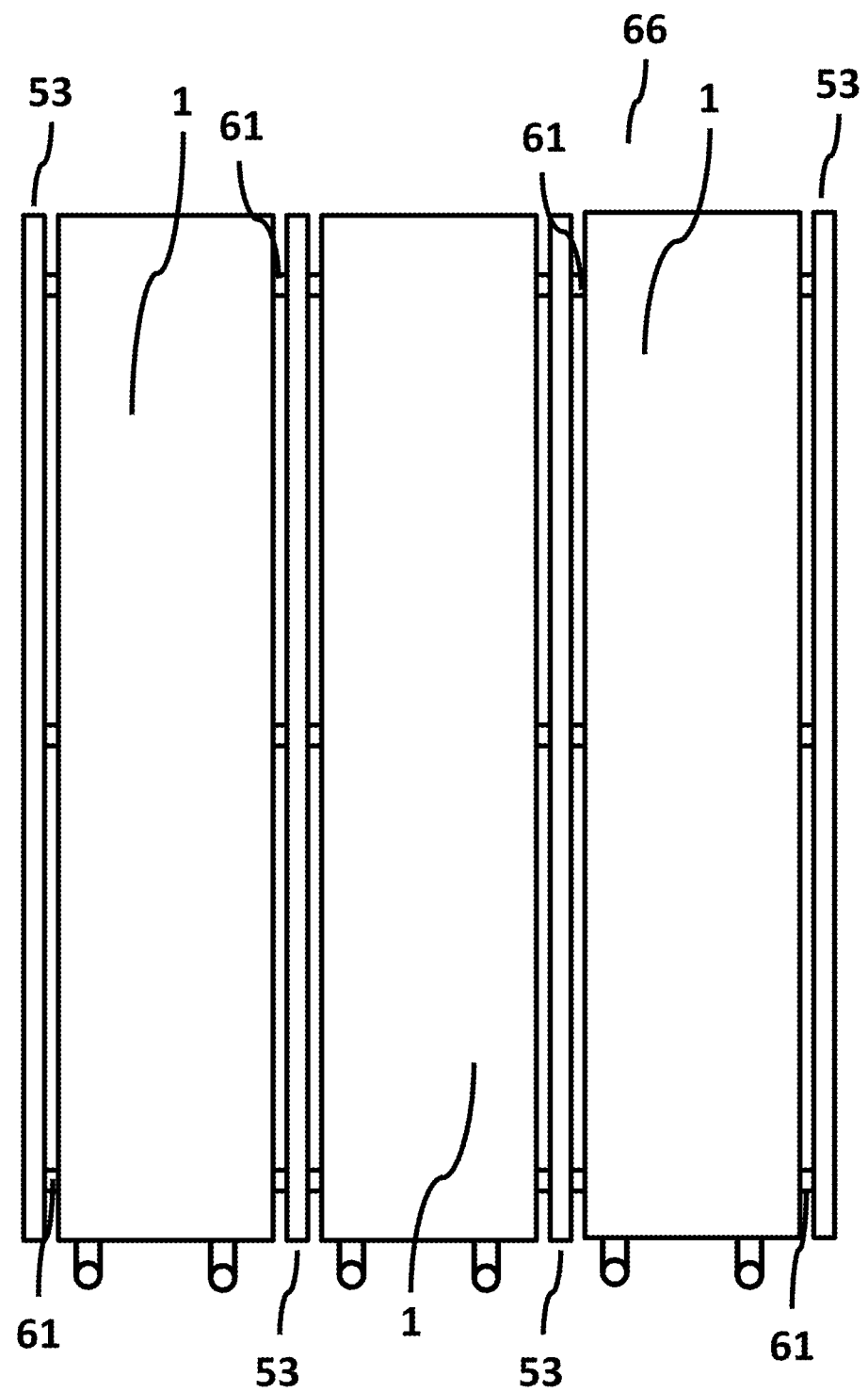
FIG. 6 illustrates one embodiment of multiple composite storage tank modules in a composite storage tank arrangement, wherein the storage tank modules are arranged in the double flooring of a building structure, between floor beams.

FIG. 6 illustrates composite storage tank modules 1 arranged in a composite storage tank arrangement 66. The composite storage tank arrangement 66 comprises multiple storage tank modules 1 that are connected to one another. FIG. 6 furthermore illustrates how the composite storage tank modules 1 may be arranged on transverse floor beams 61 crossing the floor beams 53. Thereby, the composite storage tank modules 1 are arranged in the space between the floor beams 53.

FIG. 6 also illustrates one embodiment of the composite storage tank module 1 wherein the shape of the storage tank modules 1 are elongated, preferably about 4 meters long.

Figure 7:
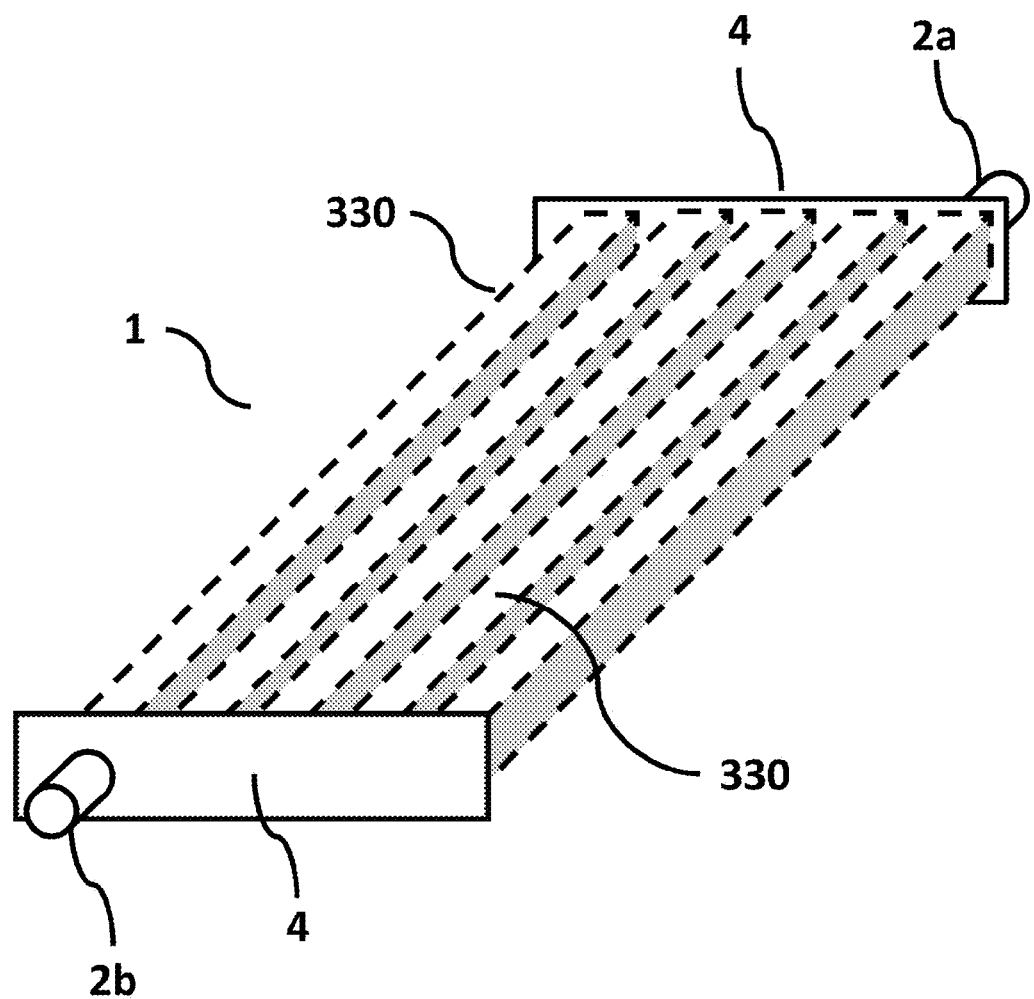
FIG. 7 illustrates a transparent view of one embodiment of the composite storage tank module and its hollow sections.

FIG. 7 illustrates an embodiment of the composite storage tank module 1 wherein the surfaces 11 are transparent or removed in a way that the hollow sections 330 inside are shown. The embodiment as illustrated in FIG. 7 is in general an example embodiment only for illustration purposes; however, in one embodiment could the composite storage tank module 1 be produced with multiple surfaces arranged on each hollow section 330 instead of one surface covering all the hollow sections 330.

Figure 8:
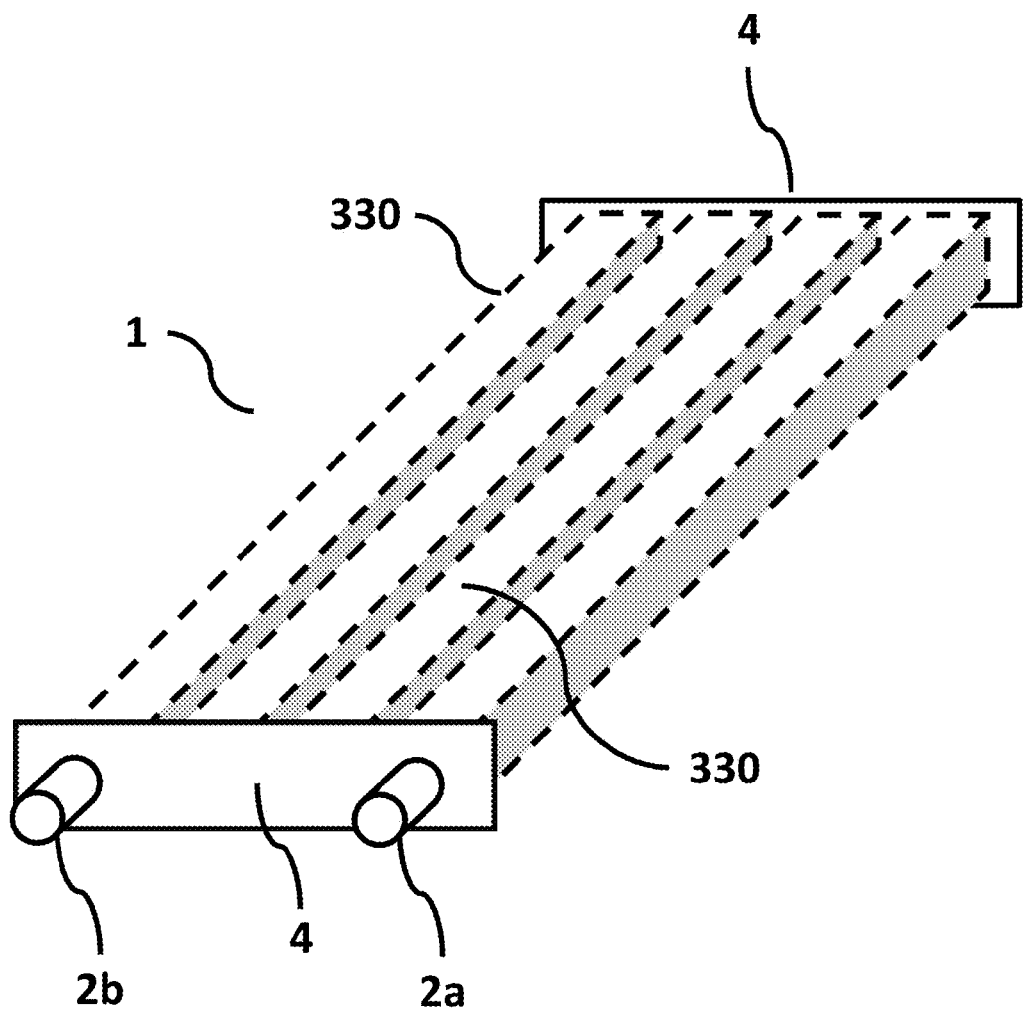
FIG. 8 illustrates another transparent view of one embodiment of the composite storage tank module and its hollow sections.

FIG. 8 illustrates another embodiment similar to the embodiment as illustrated in FIG. 7 however, with the input 2*a* and output 2*b* arranged on the same end piece 4. Those skilled in the art understands that the number of hollow sections 330 as illustrated in FIG. 3 and FIG. 4 can be any number of hollow sections 330 depending on the size and preferred application area for each composite storage tank module 1. The person skilled in the art further understands that a composite storage tank module 1 in one embodiment may comprise solely one hollow section 330. The composite storage tank module 1 as described herein is not limited to any specific number of hollow sections 330.

Figure 9:
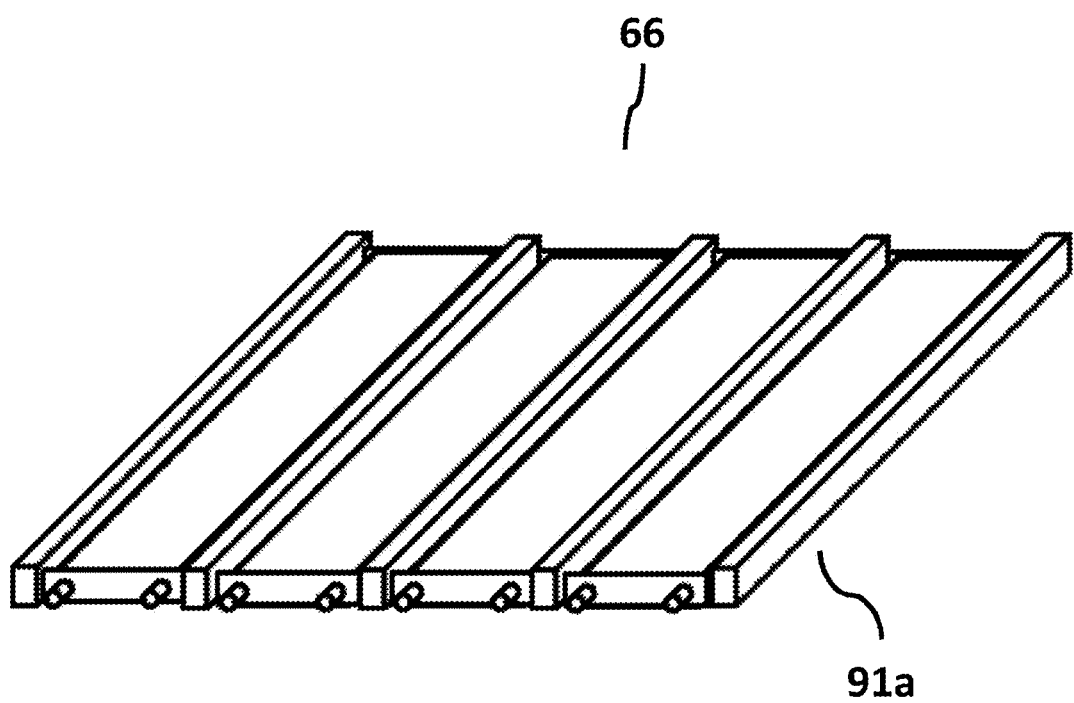
FIG. 9 illustrates one embodiment of multiple composite storage tank modules, in a composite storage tank arrangement, arranged between floor beams in a double flooring.

FIG. 9 illustrates a composite storage tank arrangement 66 comprising a first layer 91*a* of composite storage tank modules 1 arranged in one layer, preferably in the double flooring of a building structure.

In one embodiment as illustrated in FIG. 9 do the composite storage tank modules 1 of the composite storage tank arrangement 66 mutually constitute a first sub tank 91*a*. In another embodiment could the composite storage tank modules 1 of the composite storage tank arrangement 66 constitute different sub tanks.

FIG. 10 illustrates another embodiment of a composite storage tank arrangement 66 wherein multiple composite storage tank modules 1 are arranged in a first 91*a* and second 91*b* layer.

There are multiple advantages of the dual layer structure of the composite storage tank arrangement 66 as will be made by embodiments as described below. The person skilled in the art understands that the dual layer structure is a preferred structure; however the composite storage tank arrangement 66 is not limited to one, two, or any specific number of layers.

Figure 11:
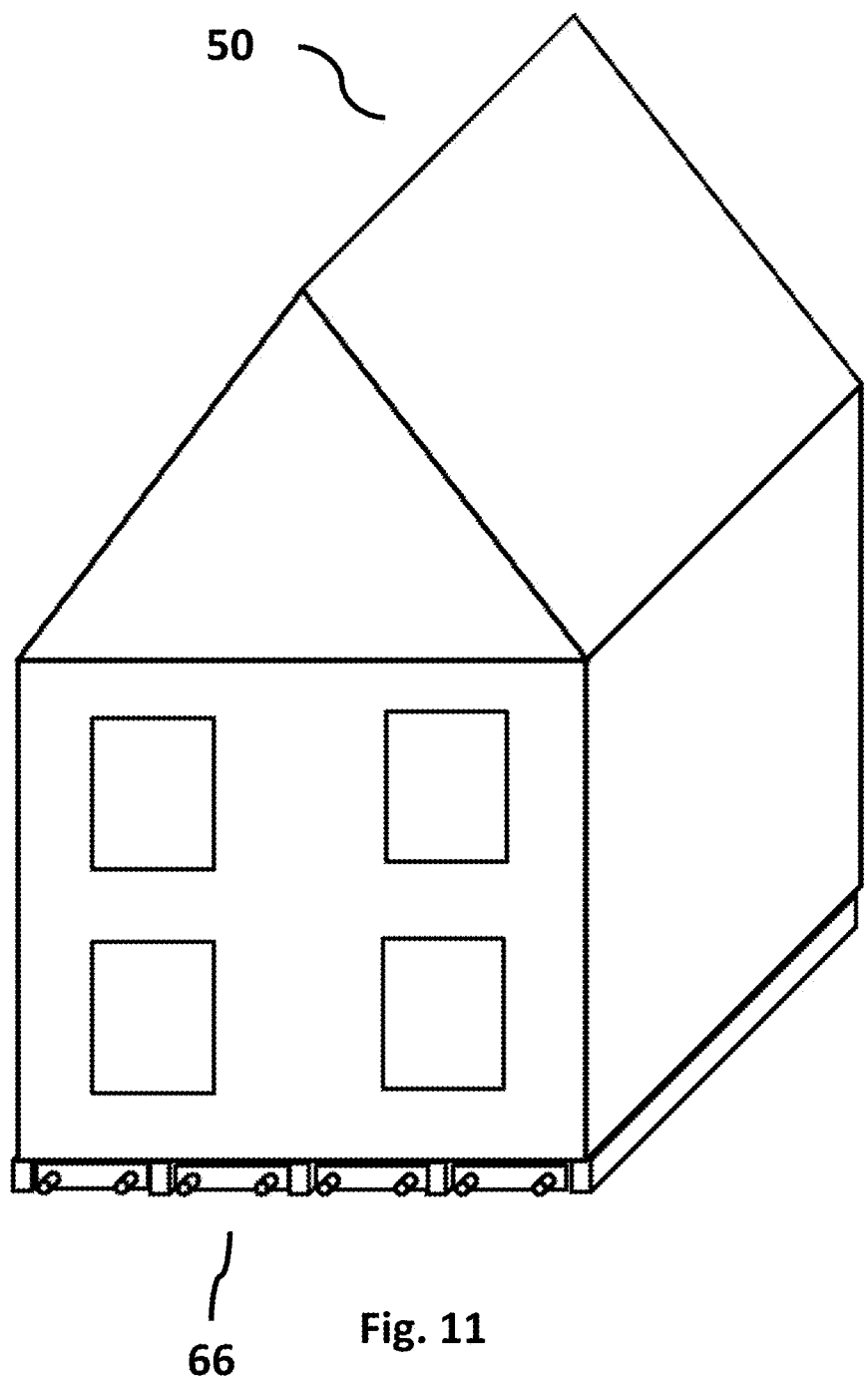
FIG. 11 illustrates one embodiment of a composite storage tank arrangement arranged in a double flooring of a building structure.

FIG. 11 illustrates an embodiment of the composite storage tank module 1 wherein multiple composite storage tank modules 1 are arranged in a composite storage tank arrangement 66 in the double flooring of a building structure 50. FIG. 11 further illustrates how the composite storage tank modules 1 each are accessible from one side of the building structure's fundament. In a preferred embodiment does each composite storage tank module 1 slide into the double floor of a building structure 50 through an opening at one side of the building structure 50. Due to the self-supporting characteristic of the composite storage tank modules 1 may each module be removed separately. This enables easy service and access to the arrangement.

The side where the access opening for the composite storage tank modules 1 are located may comprise a hatch or any other form of cover that covers the access opening when maintenance or installations not are performed.

Figure 12:
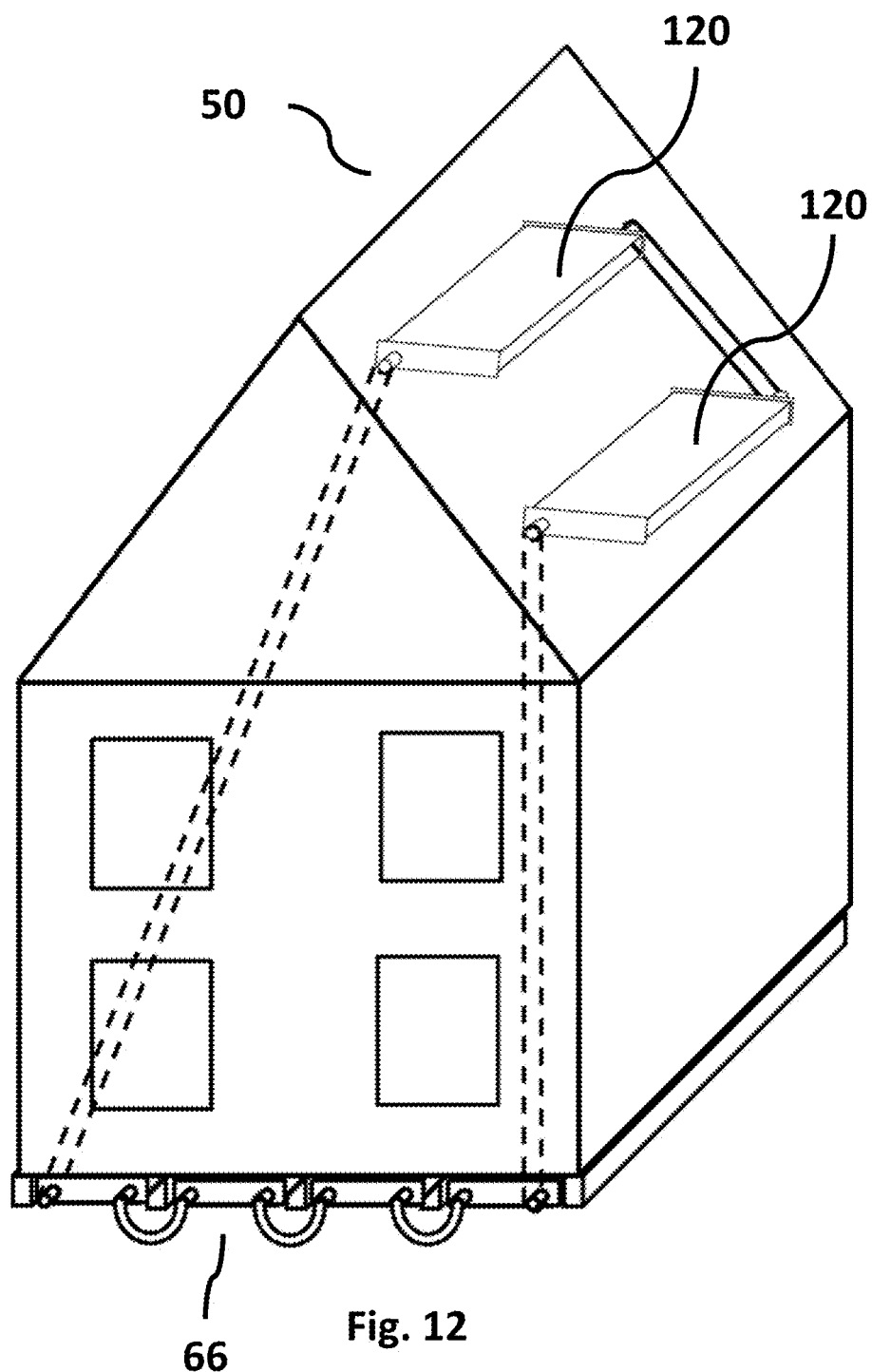
FIG. 12 illustrates one embodiment of a composite storage tank arrangement arranged in a double flooring, wherein the composite storage tank arrangement is connected to a heating system.

FIG. 12 illustrate a composite storage tank arrangement 66 comprising multiple composite storage tank modules 1 arranged in the double flooring of a building structure. The composite storage tank modules 1 are connected to one another creating a composite storage tank capable of storing a warm medium. FIG. 12 further illustrates an embodiment wherein the composite storage tank arrangement 66 is connected to a heating source 120, especially solar collectors 120, arranged on the roof of the building structure 50. The solar collectors are in a preferred embodiment composite solar collectors 120 with similar properties as the composite storage tank modules. However, the person skilled in the art understands that the heating source 120, or the heating system of the building structure, might be any form or type of heating system.

The composite storage tank arrangement 66 is connected to the heating source 120 through pipes or any similar structure. The person skilled in the art understands that the pipes may further be connected to additional heating means inside the building structure, such as radiators or underfloor heating for the second floor.

Figure 13:
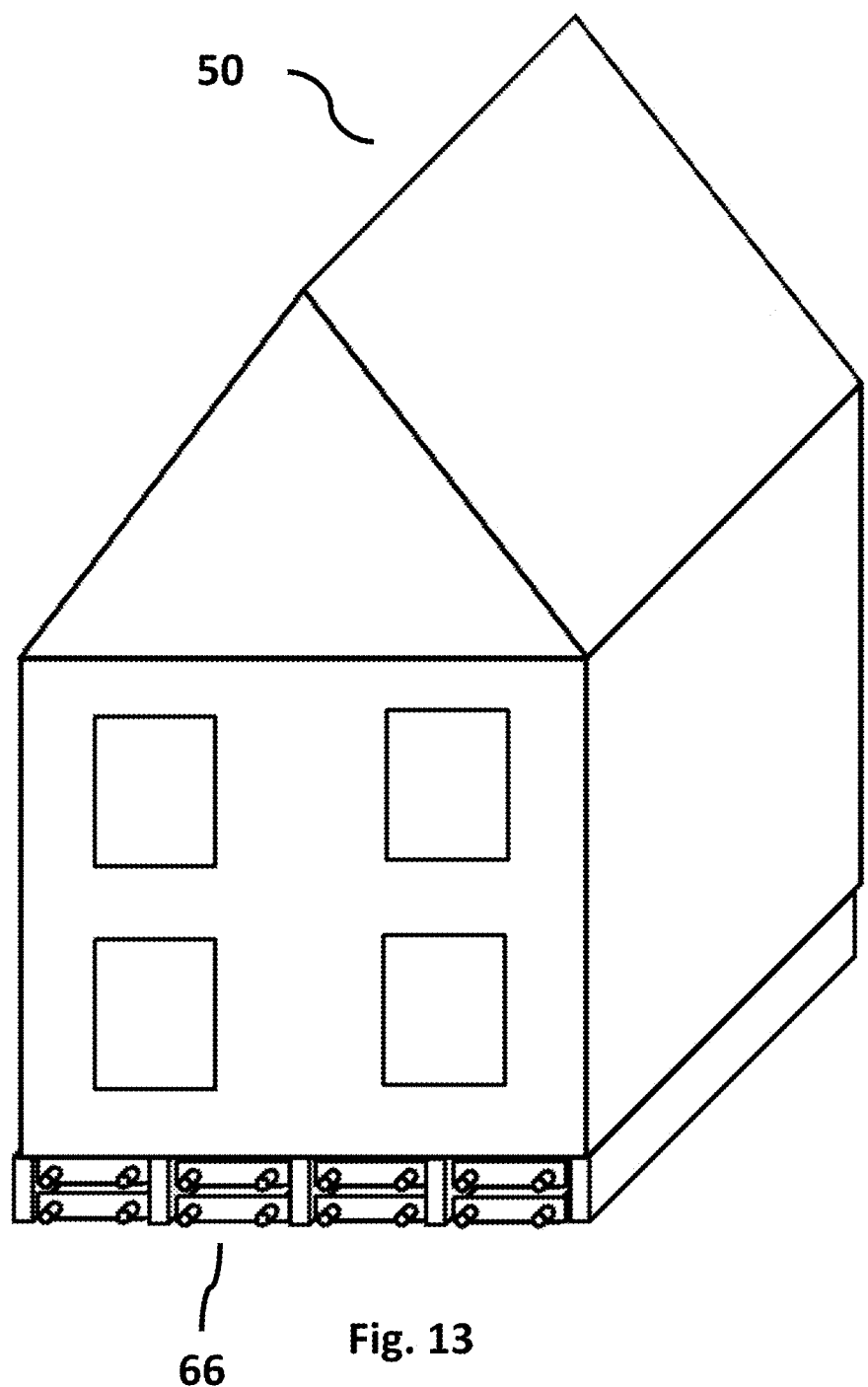
FIG. 13 illustrates one embodiment of a composite storage tank arrangement arranged in dual layers in a double flooring.

FIG. 13 illustrates another embodiment wherein the dual layer composite storage tank arrangement 66 is arranged in the double flooring of a building structure 50.

Figure 14:
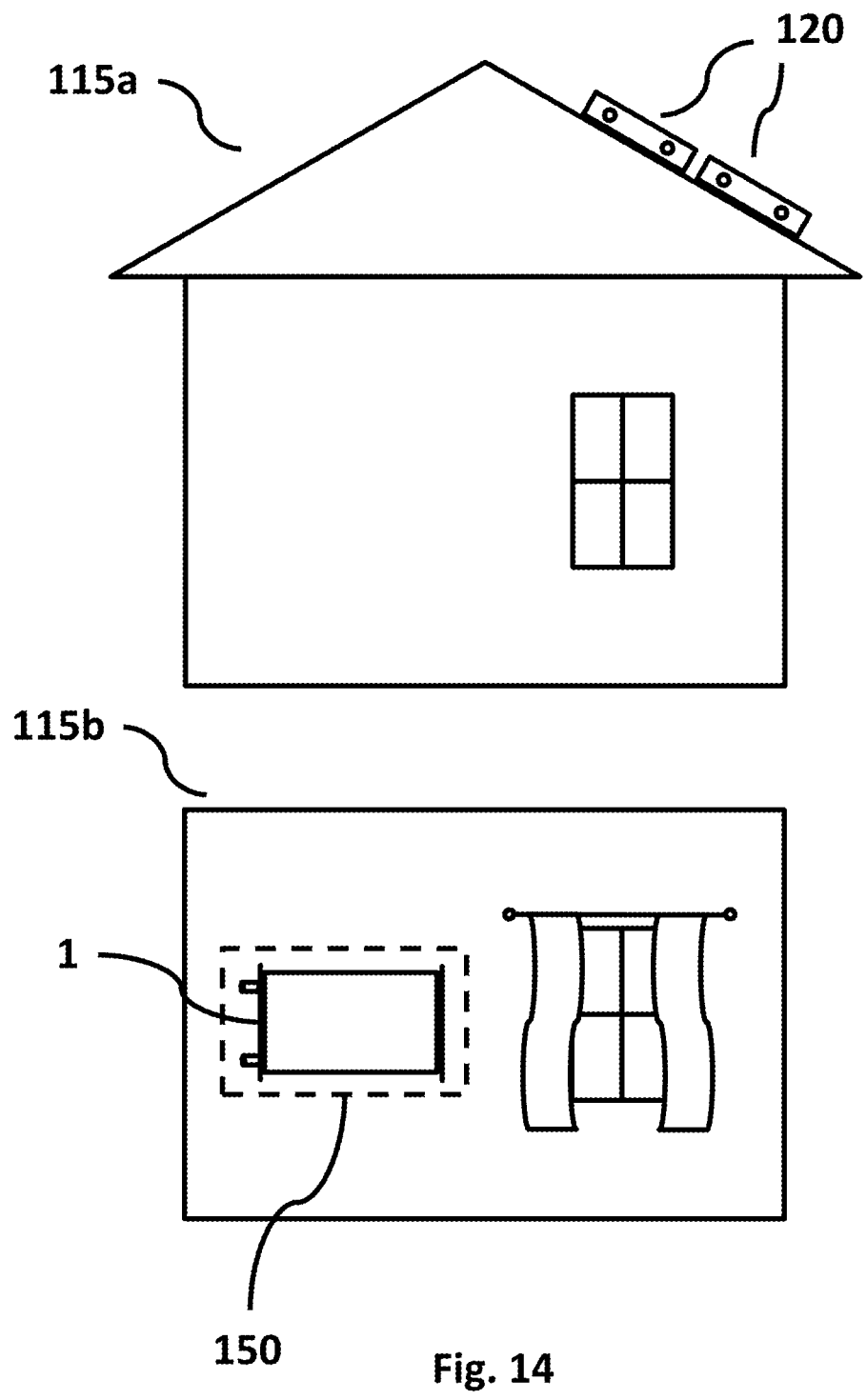
FIG. 14 illustrates one embodiment of a composite storage tank wherein the composite storage tank is arranged as a radiator.

FIG. 14 illustrates another embodiment wherein a composite storage tank module 1 is arranged as a radiator within the inside 115*b* of a building structure. The composite storage tank module 1 could for example be connected to a heating source 120 arranged on the roof of a building structure. The heating source 120 heats a medium and the heat is transferred to the inside of the building structure through the composite storage tank module 1. There are multiple advantages with the composite storage tank modules 1 in relation to previous solutions wherein radiators have been utilized as tanks. The composite storage tank module 1 may for example be covered with a painting 150, mirror 150, or any other form of interior design piece 150 without the risk of overheating said piece 150. The composite storage tank module 1 is further designed to host a large volume of medium in comparison to a traditional radiator and is cheap to produce.

In one embodiment is the design piece 150 a glass sheet adapted to cover the composite storage tank module 1.

In yet another embodiment is the design piece 150 a radiator, preferably an electric radiator or an electric glass radiator, that is adapted to provide heat at times when the heating source for the composite storage tank module 1 is not sufficient.

Figure 15:
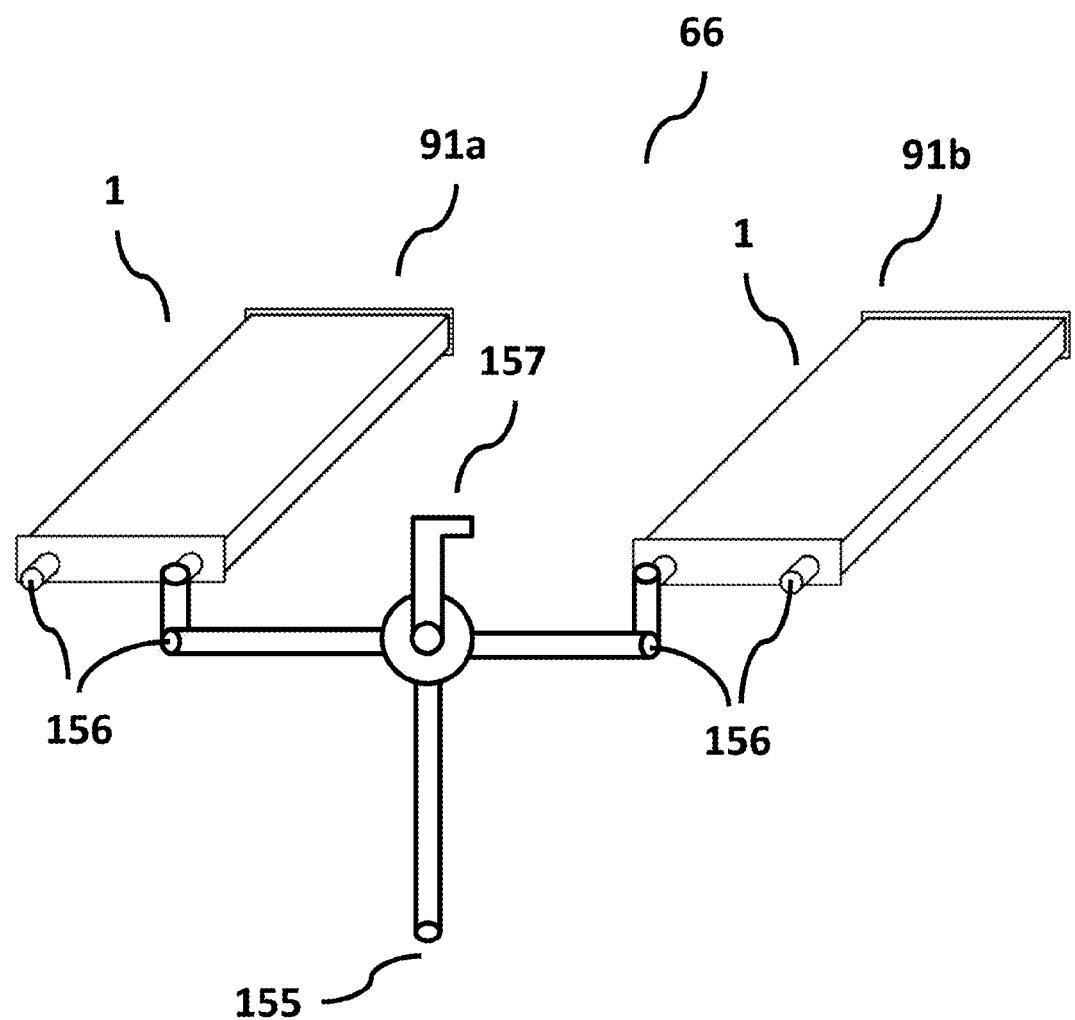
FIG. 15 illustrates one embodiment of a composite storage tank arrangement wherein the composite storage tank arrangement comprises a first and second sub-tank and attachment means for attaching the storage tank arrangement to at least two heat sources.

FIG. 15 illustrates two composite storage tank modules 1 that are connected and mutually creating a composite storage tank arrangement 66. The composite storage tank arrangement 66 further comprises a valve 157 placed between a first 91a sub-tank and a second 91b sub-tank. The person skilled in the art understands that the first 91a and second 91b sub-tanks in different embodiments of the composite storage arrangement 66 is comprised of any number of composite storage tank modules 1 and that each sub-tank may be of different size in comparison to the other sub-tank. It shall further be understood that the composite storage tank arrangement 66 in no way is limited to a first 91a and second 91b sub-tank and that FIG. 15 is only an example illustrating the solution. Thereby, a composite storage tank arrangement 66 can comprise any number of storage tank modules 1 and sub-tanks 91a, 91b.

The sub-tanks 91a, 91b each comprises connection points 156 adapted to connect each sub-tank to at least one heating source 120, such as a solar collector. Different heating sources 120 are in one embodiment connected to the different sub-tanks. The valve 157 is adapted to be actuated changing the state of the composite storage tank arrangement 66. In accordance with the claimed invention there are two states that the valves can be changed between, the first is a closed state wherein the sub-tanks are divided and the second is an open state wherein the sub-tanks are connected into one tank. The sub-tanks 91a, 91b are in one embodiment connected to the same outlet 155 sending warm medium to for example radiators or a shower. In another embodiment does each sub-tank have an individual outlet 155.

The valve 157 may further be adapted to control the temperature of the medium running thorough the outlet 155 in order to for example change the temperature in radiators within the building structure. The valve 157 is thereby in one embodiment a temperature regulator or thermostat.

Figure 16:
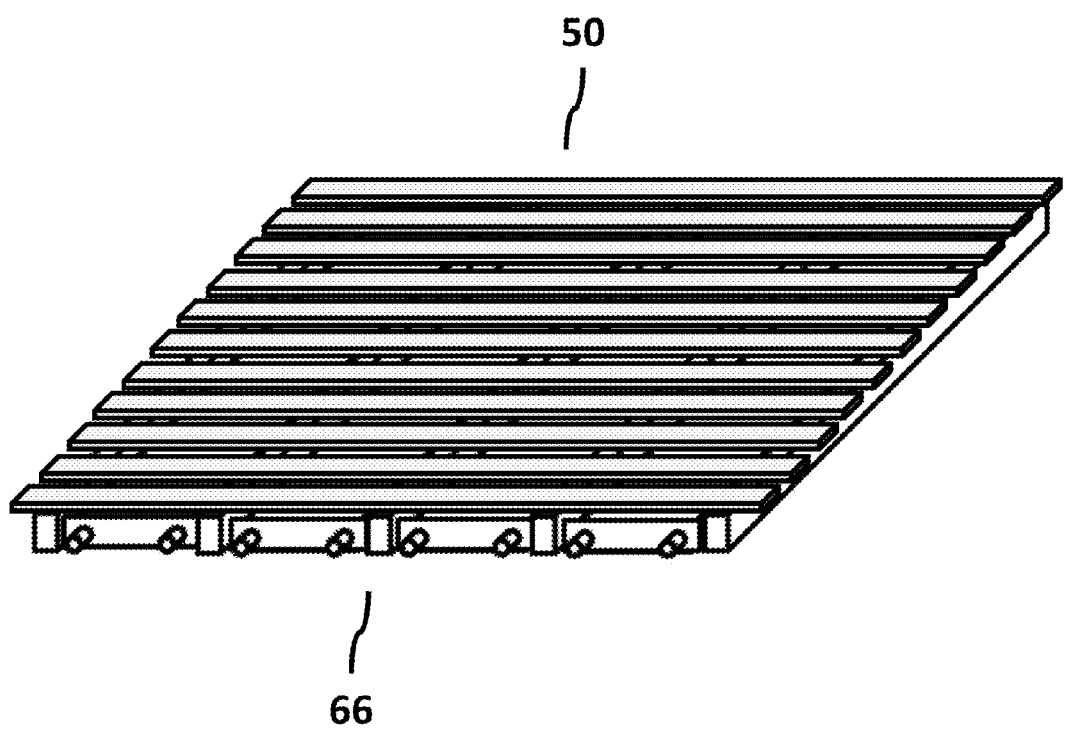
FIG. 16 illustrates one embodiment of a composite storage tank arrangement wherein the storage tank modules are arranged under a building structure, in this case a balcony floor.

FIG. 16 illustrates another embodiment of the composite storage tank module 1 in a composite storage tank arrangement 66 wherein the composite storage tank arrangement 66 is arranged in the double flooring of a patio, veranda, or balcony 50. The composite storage tank arrangement 66 is in this embodiment adapted to replace outdoor heating systems such as infrared heating system or any other heating or cooling system with high energy consumption.

The invention claimed is:

1. A composite storage tank module comprising at least one hollow section adapted to house a medium, wherein the storage tank module is an elongated self-supporting structure produced from a composite material constituted of at least a first and second material, wherein the first material is a polymer and the second material is wood fibers in the form of wood shavings having a coefficient of elasticity which when arranged in the composite storage tank module is equal to the coefficient of elasticity of the polymer, and the composite storage tank module is adapted to be embedded in a building structure.

2. The composite storage tank module according to claim 1, wherein said composite storage tank module is a profile produced through extrusion.

3. The composite storage tank module according to claim 1, wherein said composite storage tank module is adapted to store a warm medium and the composite storage tank module is arranged under a floor to enable that the excessive heat emitted from said composite storage tank to be used as underfloor heating.

4. A composite storage tank arrangement, comprising a first and a second composite storage tank module according to claim 1, wherein said first and second storage tank modules are arranged side by side in a double flooring of a building structure, wherein said first and second storage tank modules are interconnected to mutually constitute at least one composite storage tank.

5. The composite storage tank arrangement according to claim 4, wherein the composite storage tank arrangement is connected to at least one heating system.

6. A composite storage tank arrangement, comprising a first and a second composite storage tank module according to claim 1, wherein said first and second storage tank modules are arranged side by side in a double flooring of a building structure, wherein said first and second storage tank modules are interconnected to mutually constitute at least one composite storage tank, wherein said composite storage tank arrangement further comprises a third and fourth composite storage tank module, wherein the first and second composite storage tank modules are arranged as a first layer and the third and fourth composite storage tank modules are arranged as a second layer, wherein the second layer is arranged on top of the first layer, and wherein said composite storage tank modules are arranged in a double flooring of a building structure.

7. The composite storage tank arrangement according to claim 6, wherein said first layer of composite storage tank modules and said second layer are fluidly separated.

8. The composite storage tank arrangement according to claim 4, wherein
said composite storage tank modules are arranged in fluid connection,
said fluid connection comprising at least one valve,
in a closed state of the valve are the composite storage tank modules creating a first and a second sub-tank,
in an open state of the valve are the composite storage tank modules creating one common tank,
the composite storage tank arrangement is connected to at least two heating systems, and
the at least two heating systems can be used separately and together through means of actuation of the valve.

9. The composite storage tank arrangement according to claim 8, wherein said first and second sub-tanks correspond to the first and second layers.

10. The composite storage tank arrangement according to claim 4, wherein said composite storage tank arrangement is arranged as an underfloor heating system.

* * * * *